(12) United States Patent
Miura

(10) Patent No.: US 11,641,028 B2
(45) Date of Patent: May 2, 2023

(54) NONAQUEOUS ELECTROLYTE SECONDARY BATTERY

(71) Applicant: SEIKO INSTRUMENTS INC., Chiba (JP)

(72) Inventor: Ken Miura, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 442 days.

(21) Appl. No.: 17/060,815

(22) Filed: Oct. 1, 2020

(65) Prior Publication Data

US 2021/0020980 A1 Jan. 21, 2021

Related U.S. Application Data

(63) Continuation-in-part of application No. 15/549,795, filed as application No. PCT/JP2016/055709 on Feb. 25, 2016, now Pat. No. 10,833,367.

(30) Foreign Application Priority Data

Mar. 12, 2015 (JP) .................................. 2015-049560

(51) Int. Cl.
H01M 10/0525 (2010.01)
H01M 10/0568 (2010.01)
(Continued)

(52) U.S. Cl.
CPC ....... H01M 10/0525 (2013.01); H01M 4/366 (2013.01); H01M 4/483 (2013.01);
(Continued)

(58) Field of Classification Search
CPC ......... H01M 10/0525; H01M 10/0568; H01M 10/0569; H01M 10/0427; H01M 4/366;
(Continued)

(56) References Cited

U.S. PATENT DOCUMENTS

| 5,348,818 A | 9/1994 | Asami et al. |
| 2003/0152839 A1 | 8/2003 | Kawai et al. |

(Continued)

FOREIGN PATENT DOCUMENTS

| CN | 101636864 A | 1/2010 |
| CN | 104377350 A | 2/2015 |

(Continued)

OTHER PUBLICATIONS

International Search Report, and English language translation thereof, in corresponding International Application No. PCT/JP2016/055709, dated May 24, 2016, 4 pages.
(Continued)

*Primary Examiner* — Osei K Amponsah
(74) *Attorney, Agent, or Firm* — Crowell & Moring LLP

(57) ABSTRACT

A nonaqueous electrolyte secondary battery including a positive electrode that includes a lithium-manganese oxide as a positive electrode active material, a negative electrode includes $SiO_x$ ($0 \leq X < 2$) in which at least a part of a surface is covered with carbon, or a Li-Al alloy as the negative electrode active material, a low-viscosity electrolytic solution that contains propylene carbonate (PC), ethylene carbonate (EC), and dimethoxy ethane (DME) as an organic solvent in a range of {PC:EC:DME}={0.5 to 1.5:0.5 to 1.5:1 to 3} in terms of a volume ratio, and lithium bis(fluorosulfonyl)imide (LiFSI) as a supporting salt in an individual amount of 0.6 to 1.2 (mol/L), and the viscosity of the electrolytic solution is constant at higher than $-30°$ C. to room temperature.

4 Claims, 1 Drawing Sheet

(51) Int. Cl.
*H01M 10/0569* (2010.01)
*H01M 4/505* (2010.01)
*H01M 4/525* (2010.01)
*H01M 4/36* (2006.01)
*H01M 4/62* (2006.01)
*H01M 4/48* (2010.01)
*H01M 10/04* (2006.01)
*H01M 4/02* (2006.01)

(52) U.S. Cl.
CPC .......... *H01M 4/505* (2013.01); *H01M 4/525* (2013.01); *H01M 4/625* (2013.01); *H01M 4/626* (2013.01); *H01M 10/0427* (2013.01); *H01M 10/0568* (2013.01); *H01M 10/0569* (2013.01); *H01M 2004/021* (2013.01); *H01M 2220/30* (2013.01); *H01M 2300/004* (2013.01)

(58) Field of Classification Search
CPC ...... H01M 4/483; H01M 4/505; H01M 4/525; H01M 4/625; H01M 4/626; H01M 2004/021
See application file for complete search history.

(56) References Cited

U.S. PATENT DOCUMENTS

| | | |
|---|---|---|
| 2004/0106047 A1 | 6/2004 | Mie et al. |
| 2008/0096110 A1 | 4/2008 | Bito et al. |
| 2008/0233467 A1 | 9/2008 | Issaev et al. |
| 2009/0061323 A1 | 3/2009 | Totir et al. |
| 2011/0136009 A1 | 6/2011 | Muthu et al. |
| 2015/0207112 A1 | 7/2015 | Sawayama et al. |
| 2018/0019500 A1 | 1/2018 | Miura et al. |

FOREIGN PATENT DOCUMENTS

| | | |
|---|---|---|
| CN | 104795519 A | 7/2015 |
| EP | 2 897 188 A1 | 7/2015 |
| EP | 2897188 A1 | 7/2015 |
| JP | 2000-243449 A | 9/2000 |
| JP | 2008-257963 A | 10/2008 |
| JP | 2010-521052 A | 6/2010 |
| JP | 2013-062136 A | 4/2013 |
| JP | 2013101770 A | 5/2013 |
| JP | 2014-029874 A | 2/2014 |
| JP | 2014-179203 A | 9/2014 |
| JP | 2015-026531 A | 2/2015 |
| KR | 10-2015-0019259 A | 2/2015 |
| WO | WO 2008/114219 A1 | 9/2008 |

OTHER PUBLICATIONS

Office Action, and English language translation thereof, in corresponding Japanese Application No. 2016-543260, dated Oct. 4, 2016, 7 pages.

Office Action, including English translation, in Korean Application No. 10-2017-7020833 dated Jun. 28, 2018, pp. 1-10.

Extended European Search Report from Europe application No. 16761514.5, dated Oct. 8, 2018, pp. 1-10.

Office Action dated Dec. 25, 2018 for Chinese Application No. 201680013374.4, 10 pages.

Chinese Search Report and Office Action regarding Application No. CN201680013374.4 dated Mar. 6, 2020, with partial translation (Office Action), 6 pages.

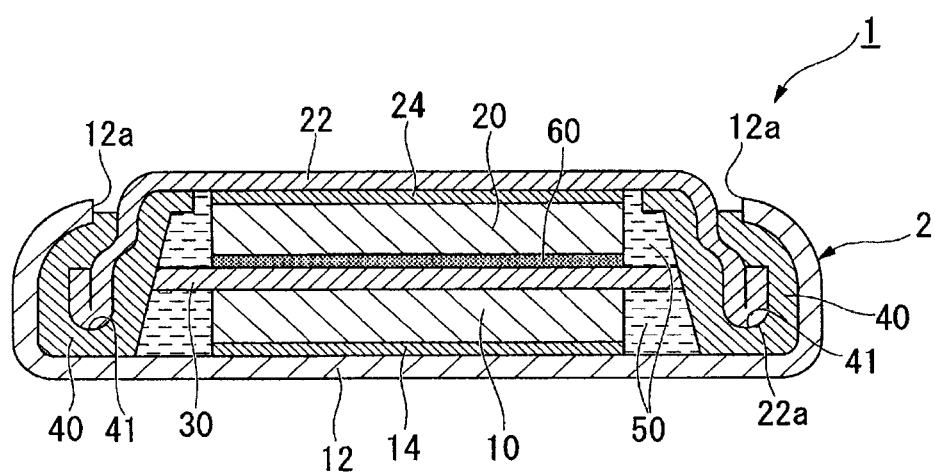

NONAQUEOUS ELECTROLYTE SECONDARY BATTERY

RELATED APPLICATIONS

This application is a Continuation-in-Part of Application Ser. No. 15/549,795, filed Aug. 9, 2017, which is a national stage of PCT/JP2016/055709, filed Feb. 25, 2016, which claims priority to Japanese Application No. 2015-049560, filed Mar. 12, 2015. The entire contents of the prior applications are hereby incorporated by reference herein in their entirety.

BACKGROUND

1. Technical Field

The present invention relates to a nonaqueous electrolyte secondary battery.

2. Background Art

A nonaqueous electrolyte secondary battery includes, in a sealed accommodation container, a pair of polarizable electrodes including a positive electrode and negative electrode, a separator interposed between the positive electrode and the negative electrode, and an electrolytic solution impregnated into the positive electrode, the negative electrode, and the separator, and includes a supporting salt and a nonaqueous solvent such as an organic solvent. The nonaqueous electrolyte secondary battery has a high energy density and is light weight. Accordingly, such a nonaqueous electrolyte secondary battery has been used in a power supply unit of an electronic apparatus, an electrical power storage unit that absorbs a variation of the amount of power generation in a power generator, and the like.

In addition, in a nonaqueous electrolyte secondary battery in which the negative electrode includes silicon oxide ($SiO_x$) as a negative electrode active material, high discharging capacity is obtained. Accordingly, such a nonaqueous electrolyte secondary battery has been used as a small-sized nonaqueous electrolyte secondary battery such as a coin-type (button-type) battery. It is known that the coin-type (button-type) nonaqueous electrolyte secondary battery has excellent charging and discharging characteristics in a high voltage and a high energy density, and has a long cycle lifetime, and thus reliability is high. According to this, the nonaqueous electrolyte battery has been used as a backup power supply of a semiconductor memory, a backup power supply with a timepiece function, and the like (for example, refer to PTL 1) in various small-sized electronic apparatuses such as a portable telephone, a PDA, a portable gaming machine, and a digital still camera in the related art.

In addition, in the nonaqueous electrolyte secondary battery, an organic electrolytic solution, in which cyclic carbonic acid ester, chain carbonic acid ester, or a mixture thereof is used as a solvent, is mainly used as an electrolytic solution. In a nonaqueous electrolyte secondary battery described in PTL 1, as the electrolytic solution, organic solvents such as dimethyl carbonate (hereinafter, may be referred to as "DMC"), diethyl carbonate (hereinafter, may be referred to as "DEC"), propylene carbonate (hereinafter, may be referred to as "PC"), and dimethoxy ethane (hereinafter, may be referred to as "DME"), which are chain carbonic acid esters, are exemplified.

CITATION LIST

Patent Literature

[PTL 1] Japanese Unexamined Patent Application, First Publication No. 2000-243449

SUMMARY OF INVENTION

Technical Problem

In the related art, for example, in a coin-type (button-type) nonaqueous electrolyte secondary battery used for backup of a memory in a portable telephone, a digital still camera, and the like, −20° C. to 60° C. is set as a range of an operation guarantee temperature. On the other hand, so as to operate various apparatuses in a cool region such as a high-latitude area, the nonaqueous electrolyte secondary battery is required to operate even under a low-temperature region environment lower than the range.

However, in the nonaqueous electrolyte secondary battery of the related art, for example, the viscosity of the electrolytic solution increases under a low-temperature environment of −30° C. to −40° C., and migration of electric charges is hindered. Therefore, there is a problem in that sufficient discharging capacity is not obtained.

The invention has been made in consideration of the problem, and an object thereof is to provide a nonaqueous electrolyte secondary battery capable of retaining sufficient discharging capacity even under a low-temperature environment, not only under room temperature conditions, and is capable of operating in a broad temperature range.

Solution to Problem

To solve the above-described problem, the present inventors have made a thorough investigation and have repeated an experiment for securing sufficient discharging capacity when using the nonaqueous electrolyte secondary battery under a low-temperature environment. As a result, they found that when a composition of an organic solvent and a supporting salt used in an electrolytic solution is adjusted and optimized, and a configuration of a negative electrode active material used in a negative electrode is optimized, it is possible to retain sufficient discharging capacity even under the low-temperature environment.

That is, first, the present inventors found that when a mixed solvent of a cyclic carbonate solvent having a structure (Chemical Formula 1) and a chain ether solvent having a structure (Chemical Formula 2) is used as the organic solvent included in the electrolyte, and a mixing ratio of the respective solvents is adjusted, it is possible to improve low-temperature characteristics without deteriorating capacity characteristics at room temperature or capacity retention rate at a high temperature.

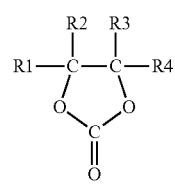
(Chemical Formula 1)

Here, in Chemical Formula 1, R1, R2, R3, and R4 represent any one of hydrogen, fluorine, chlorine, an alkyl group having 1 to 3 carbon atoms, and a fluorinated alkyl group. In addition, in Chemical Formula 1, R1, R2, R3, and R4 may be the same as each other or different from each other.

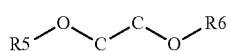
(Chemical Formula 2)

Here, in Chemical Formula 2, R7 and R8 represent any one of hydrogen, fluorine, chlorine, an alkyl group having 1 to 3 carbon atoms, and a fluorinated alkyl group. In addition, R7 and R8 may be the same as each other or different from each other.

In addition, the present inventors have repeated an additional experiment and investigation with respect to the cyclic carbonate solvent (Chemical Formula 1) and a chain ether solvent (Chemical Formula 2) which constitute the mixed solvent.

As a result, first, they found that when ethylene carbonate (EC) and propylene carbonate (PC) are used as the cyclic carbonate solvent expressed by Chemical Formula 1, it is possible to retain the capacity retention rate at a high temperature in a satisfactory manner.

In addition, they found that when dimethoxy ethane (DME) is used as the chain ether solvent expressed by Chemical Formula 2, it is possible to improve the low-temperature characteristics while securing the capacity at room temperature.

In addition, they found that when a mixing ratio of EC, PC, and DME is adjusted, an effect capable of retaining the discharging capacity under a low-temperature environment is significantly obtained.

In addition, the present inventors have found that when the solvent used in the electrolytic solution is set to the composition, and a composition and the amount of the supporting salt are adjusted and optimized, the above-described effect capable of retaining the discharging capacity under a low-temperature environment is significantly obtained.

In addition, the present inventors obtained the following finding. In addition to the optimization of the composition of the electrolytic solution, when using any one material among materials including $SiO_x$ (0≤X<2) in which at least a surface of particles is covered with carbon, or a Li—Al alloy as a negative electrode active material used in the negative electrode, the above-described effect capable of retaining the discharging capacity under the low-temperature environment is more significantly obtained, and an operation in a broad temperature range is possible.

That is, according to an aspect of the invention, a nonaqueous electrolyte secondary battery is provided, including: a positive electrode that includes a lithium-manganese oxide as a positive electrode active material; a negative electrode that includes $SiO_x$ (0≤X<2) in which at least a part of a surface is covered with carbon, or a Li—Al alloy as a negative electrode active material; a low-viscosity electrolytic solution that contains propylene carbonate (PC), ethylene carbonate (EC), and dimethoxy ethane (DME) as an organic solvent in a range of {PC:EC:DME}={0.5 to 1.5:0.5 to 1.5:1 to 3} in terms of a volume ratio, and lithium bis(fluorosulfonyl)imide (LiFSI) as a supporting salt in an individual amount of 0.6 to 1.2 (mol/L), and the viscosity of the electrolytic solution is constant at higher than −30° C. to room temperature.

According to the aspect of the invention, first, the organic solvent used in the electrolytic solution is adjusted to have the above-described composition, and thus it is possible to prevent the viscosity of the electrolytic solution from increasing under a low-temperature environment of near −30° C. not only under room temperature conditions. According to this, it is possible to suppress migration of electric charges from being hindered. As a result, discharging characteristics under the low-temperature environment are improved, and it is possible to retain sufficient discharging capacity in a broad temperature range.

Specifically, first, when using PC and EC, which have a high dielectric constant and high solubility for the supporting salt, as a cyclic carbonate solvent, it is possible to obtain great discharging capacity. In addition, when considering that the boiling points of PC and EC are high, even in a case of being used or stored under a high-temperature environment, the electrolytic solution is less likely to volatilize.

In addition, when PC having a melting point lower than that of EC and EC is mixed and used as a cyclic carbonate solvent, it is possible to improve low-temperature characteristics.

In addition, when using DME having a low melting point as a chain ether solvent, the low-temperature characteristics are improved. In addition, DME has a low viscosity, and thus electrical conductivity of the electrolytic solution is improved. In addition, DME solvates with Li ions, and thus the discharging capacity of the nonaqueous electrolyte secondary battery increases.

In addition, as the supporting salt used in the electrolytic solution, when using a salt including the lithium compound in a molar ratio of the range, sufficient discharging capacity is obtained in a broad temperature range including the low-temperature environment, and thus battery characteristics are improved.

In addition, according to the aspect of the invention, as the negative electrode active material in the negative electrode, when using one or both of $SiO_x$ (0≤X<2) in which a surface is covered with carbon, or the Li—Al alloy, conductivity of the negative electrode is improved, and an increase in internal resistance under the low-temperature environment is suppressed. Accordingly, voltage drop at initial discharging is suppressed, and thus it is possible to further stabilize the discharging characteristics.

In addition, in the nonaqueous electrolyte secondary battery according to the aspect of the invention, the electrolytic solution contains lithium bis(fluorosulfonyl)imide (LiFSI) as the supporting salt in an individual amount of 0.6 to 1.2 (mol/L).

When LiFSI having excellent conductivity is set as the supporting salt used in the electrolytic solution, it is possible to suppress voltage drop at initial discharging. According to this, it is also possible to improve discharging characteristics under the low-temperature environment not only under room temperature conditions, and sufficient discharging capacity is obtained in a broad temperature range. As a result, battery characteristics are improved.

In addition, in the nonaqueous electrolyte secondary battery configured as described above according to the aspect of the invention, the positive electrode may include at least $Li_{1+x}Co_yMn_{2-x-y}O_4$ (0≤x≤0.33, 0<y≤0.2) as the lithium-manganese oxide used in the positive electrode active material.

When using the positive electrode including a compound having the above-described composition as the lithium-manganese oxide used in the positive electrode active material, the discharging characteristics under the low-temperature environment are improved, and thus sufficient discharging capacity is obtained in a broad temperature range. As a result, the battery characteristics are improved.

In addition, in the nonaqueous electrolyte secondary battery configured as described above according to the aspect of the invention, capacity balance { negative electrode capacity (mAh)/positive electrode capacity (mAh)}, which is expressed by capacity of the negative electrode and capacity of the positive electrode, may be in a range of 1.56 to 2.51.

When the capacity balance {negative electrode capacity (mAh)/positive electrode capacity (mAh)} between the negative electrode and the positive electrode is set to the above-described range, and a predetermined margin is secured for the capacity on the negative electrode side, even when decomposition of the negative electrode active material due to a battery reaction rapidly progresses, it is possible to secure negative electrode capacity equal to or greater than a constant value. According to this, even when the nonaqueous electrolyte secondary battery is stored or used for a long period of time under strict temperature and humidity environments, the discharging capacity does not decrease, and storage characteristics are improved.

In addition, in the nonaqueous electrolyte secondary battery configured as described above according to the aspect of the invention, a particle size (D50) of $SiO_x$ (0≤X<2) included in the negative electrode active material and in which at least a part of a surface is covered with carbon may be 0.1 to 30 μm.

When the particle size (D50) of $SiO_x$ (0≤X<2) included in the negative electrode active material and in which at least a part of a surface is covered with carbon is in the above-described range, even when expansion or contraction of the negative electrode occurs during charging and discharging of the nonaqueous electrolyte secondary battery, conductivity is retained. As a result, a decrease in charging and discharging characteristics such as cycle characteristics is suppressed.

Advantageous Effects of Invention

According to the nonaqueous electrolyte secondary battery of the aspect of the invention, as described above, the composition of the organic solvent and the supporting salt used in the electrolytic solution is optimized. In addition, as the negative electrode active material in the negative electrode, when using an active material including any one or both of $SiO_x$ (0≤X<2) in which a surface is covered with carbon and a Li—Al alloy, it is possible to improve discharging characteristics under a low-temperature environment, not only under room temperature conditions.

According to this, even when the nonaqueous electrolyte secondary battery is used or stored under a low-temperature environment of near −30° C. not only under room temperature conditions, it is possible to prevent the viscosity of the electrolytic solution from increasing, excellent discharging characteristics are obtained, and thus it is possible to retain sufficient discharging capacity in a broad temperature range.

As a result, it is possible to provide a nonaqueous electrolyte secondary battery in which the battery characteristics do not deteriorate even under the low-temperature environment not only under room temperature conditions, and thus excellent charging and discharging characteristics are obtained in a broad temperature range, and excellent storage characteristics are provided.

BRIEF DESCRIPTION OF THE DRAWING

FIG. 1 is a cross-sectional view schematically illustrating a nonaqueous electrolyte secondary battery configured as a coin-type (button-type) according to an embodiment of the invention.

DESCRIPTION OF EMBODIMENTS

Hereinafter, a configuration of a nonaqueous electrolyte secondary battery according to an embodiment of the invention will be described in detail with reference to FIG. 1. Furthermore, specifically, in the nonaqueous electrolyte secondary battery described in the invention, an active material used as a positive electrode or a negative electrode, and an electrolytic solution are accommodated in a container, but the configuration related to the invention is also applicable to an electrochemical cell such as a lithium ion capacitor as an example.

<Configuration of Nonaqueous Electrolyte Secondary Battery>

A nonaqueous electrolyte secondary battery 1 according to this embodiment as illustrated in FIG. 1 is a so-called coin-type (button-type) battery. The nonaqueous electrolyte secondary battery 1 includes, in an accommodation container 2, a positive electrode 10 capable of intercalating and deintercalating lithium ions, a negative electrode 20 capable of intercalating and deintercalating lithium ions, a separator 30 disposed between the positive electrode 10 and the negative electrode 20, and an electrolytic solution 50 that includes at least a supporting salt and an organic solvent.

More specifically, the nonaqueous electrolyte secondary battery 1 includes the accommodation container 2. The accommodation container 2 includes a bottomed cylindrical positive electrode casing 12, and a covered cylindrical (hat-shaped) negative electrode casing 22 which is fixed to an opening 12a of the positive electrode casing 12 through a gasket 40 and forms an accommodation space between the positive electrode casing 12 and the negative electrode casing 22. The accommodation space is sealed by caulking the peripheral edge of the opening 12a of the positive electrode casing 12 to an inner side, that is, to the negative electrode casing 22 side.

In the accommodation space sealed by the accommodation container 2, the positive electrode 10 provided on the positive electrode casing 12 side, and the negative electrode 20 provided on the negative electrode casing 22 side are disposed to face each other through the separator 30. In addition, the accommodation container 2 is filled with the electrolytic solution 50. In addition, in an example illustrated in FIG. 1, lithium foil 60 is interposed between the negative electrode 20 and the separator 30.

In addition, as illustrated in FIG. 1, the gasket 40 is inserted along an inner peripheral surface of the positive electrode casing 12, and is connected to the outer periphery of the separator 30 to support the separator 30.

In addition, the positive electrode 10, the negative electrode 20, and the separator 30 are impregnated with the electrolytic solution 50 in the accommodation container 2.

In the nonaqueous electrolyte secondary battery 1 of the example illustrated in FIG. 1, the positive electrode 10 is electrically connected to an inner surface of the positive electrode casing 12 through a positive electrode current collector 14, and the negative electrode 20 is electrically connected to an inner surface of the negative electrode casing 22 through a negative electrode current collector 24. In this embodiment, the nonaqueous electrolyte secondary battery 1 including the positive electrode current collector 14 and the negative electrode current collector 24 as illustrated in FIG. 1 is described as an example. However, there is no limitation thereto, and for example, a configuration in which the positive electrode casing 12 also serves as a positive electrode current collector and the negative electrode casing 22 also serves as the negative electrode current collector may be used.

The nonaqueous electrolyte secondary battery 1 of this embodiment is configured as described above, and lithium ions migrate from one side of the positive electrode 10 and the negative electrode 20 to the other side thereof, and thus electric charges can be stored (charged) or emitted (discharged).

In addition, the nonaqueous electrolyte secondary battery 1 of this embodiment includes the positive electrode 10 that includes a lithium-manganese oxide as a positive electrode active material, the negative electrode 20 that includes $SiO_x$ ($0 \leq X < 2$) in which at least a part of a surface is covered with carbon, or a Li—Al alloy as a negative electrode active material, and the electrolytic solution 50 that contains propylene carbonate (PC), ethylene carbonate (EC), and dimethoxy ethane (DME) as an organic solvent in a range of {PC:EC:DME}={0.5 to 1.5:0.5 to 1.5:1 to 3} in terms of a volume ratio, and at least one of lithium bis(fluorosulfonyl) imide (LiFSI) and lithium bis(trifluoromethane sulfonyl) imide (LiTFSI) as a supporting salt in a total amount of 0.6 to 1.4 (mol/L).

[Positive Electrode Casing and Negative Electrode Casing]

In this embodiment, the positive electrode casing 12 that constitutes the accommodation container 2 is configured in a bottomed cylindrical shape as described above, and has the opening 12a having a circular shape in plan view. As a material of the positive electrode casing 12, a material known in the related art may be used without any limitation, and examples thereof include stainless steel such as SUS329J4L and NAS64.

In addition, the negative electrode casing 22 is configured in a covered cylindrical shape (hat shape) as described above, and has a configuration such that an apical end 22a thereof is inserted into the positive electrode casing 12 from the opening 12a. Examples of a material of the negative electrode casing 22 include stainless steel, which is known in the related art, similar to the material of the positive electrode casing 12, and for example, SUS304-BA and the like can be used. In addition, for example, a clad material obtained by pressure-welding copper, nickel, or the like to the stainless steel can be also used as the negative electrode casing 22.

As illustrated in FIG. 1, in a state in which the gasket 40 is interposed between the positive electrode casing 12 and the negative electrode casing 22, the peripheral edge of the opening 12a of the positive electrode casing 12 is crimped to the negative electrode casing 22 side, and thus the nonaqueous electrolyte secondary battery 1 is sealed and is retained in a state in which the accommodation space is formed. Accordingly, the maximum inner diameter of the positive electrode casing 12 is set to a dimension greater than the maximum outer diameter of the negative electrode casing 22.

Typically, the sheet thickness of a metal sheet used in the positive electrode casing 12 or the negative electrode casing 22 is approximately 0.1 to 0.3 mm. For example, an average sheet thickness of the entirety of the positive electrode casing 12 or the negative electrode casing 22 may be set to approximately 0.20 mm.

In addition, in the example illustrated in FIG. 1, the apical end 22a of the negative electrode casing 22 is set to a folded-back shape along an outer side surface of the negative electrode casing 22, but there is no limitation thereto. For example, even in a case of using the negative electrode casing 22 that does not have the folded-back shape in which an end surface of the metal sheet is set as the apical end 22a, the invention is applicable to this case.

In addition, examples of the nonaqueous electrolyte secondary battery to which the configuration described in detail in this embodiment is applicable include batteries of various sizes in addition to 920 size (outer diameter ϕ of 9 mm×height of 2.0 mm), which is a typical size of a coin-type nonaqueous electrolyte secondary battery.

[Gasket]

As illustrated in FIG. 1, the gasket 40 is formed in an annular ring shape along the inner peripheral surface of the positive electrode casing 12, and the apical end 22a of the negative electrode casing 22 is disposed inside an annular groove 41 of the gasket 40.

In addition, for example, it is preferable that a material of the gasket 40 be a resin in which a heat deformation temperature is 230° C. or higher. When the heat deformation temperature of the resin material used in the gasket 40 is 230° C. or higher, even when the nonaqueous electrolyte secondary battery 1 is used or stored under a high-temperature environment, or even when heat generation occurs during use of the nonaqueous electrolyte secondary battery 1, it is possible to prevent the electrolytic solution 50 from being leaked due to deformation of the gasket.

Examples of a material of the gasket 40 include plastic resins such as a polypropylene resin (PP), polyphenyl sulfide (PPS), polyethylene terephthalate (PET), polyamide, a liquid crystal polymer (LCP), a tetrafluoroethylene-perfluoroalkyl vinyl ether copolymer resin (PFA), a polyether ether ketone resin (PEEK), a polyether nitrile resin (PEN), a polyether ketone resin (PEK), a polyarylate resin, a polybutylene terephthalate resin (PBT), a polycyclohexane dimethylene terephthalate resin, a polyether sulfone resin (PES), a polyamino bismaleimide resin, a polyether imide resin, and a fluorine resin. Among these, it is preferable to use the polypropylene resin in the gasket 40 when considering that it is possible to prevent the gasket from being greatly deformed during use or storage under a high-temperature environment, and the sealing properties of the nonaqueous electrolyte secondary battery are further improved.

In addition, in the gasket 40, a material obtained by mixing glass fiber, mica, whiskers, ceramic fine powders, and the like to the above-described material in an addition amount of 30 mass % or less may be appropriately used. When using this material, it is possible to prevent the gasket from being greatly deformed due to a high temperature, and thus it is possible to prevent the electrolytic solution 50 from being leaked.

In addition, a sealing agent may be further applied onto an inner side surface of the annular groove of the gasket 40. As the sealing agent, asphalt, an epoxy resin, a polyamide-based resin, a butyl rubber-based adhesive, and the like can be used. In addition, after being applied onto the inside of the annular groove 41, the sealing agent is dried.

In addition, the gasket 40 is interposed between the positive electrode casing 12 and the negative electrode casing 22, and at least a part of the gasket 40 enters a compressed state. However, a compression rate at this time is not particularly limited, and may be set to a range in which an inner side of the nonaqueous electrolyte secondary battery 1 can be reliably sealed, and fracture does not occur in the gasket 40.

[Electrolytic Solution]

In the nonaqueous electrolyte secondary battery 1 of this embodiment, as the electrolytic solution 50, an electrolytic solution including at least an organic solvent and a supporting salt is used. In addition, in the electrolytic solution 50 described in this embodiment, as the organic solvent, a mixed solvent containing propylene carbonate (PC), ethylene carbonate (EC), and dimethoxy ethane (DME) in a range of {PC:EC:DME}={0.5 to 1.5:0.5 to 1.5:1 to 3} in terms of a volume ratio is used. In addition, the electrolytic solution 50 contains at least one of lithium bis(fluorosulfonyl)imide (LiFSI) as a supporting salt in an individual amount of 0.6 to 1.2 (mol/L).

Typically, the electrolytic solution 50 is obtained by dissolving the supporting salt in a nonaqueous solvent such as the organic solvent, and characteristics of the electrolytic solution 50 are determined in consideration of the heat resistance, viscosity, and the like required for the electrolytic solution 50.

Generally, in a case of using the electrolytic solution containing the organic solvent in the nonaqueous electrolyte secondary battery, temperature dependency of conductivity increases when considering that solubility for a lithium salt is deficient, and thus there is a problem in that characteristics at a low temperature greatly decrease in comparison to characteristics at room temperature. On the other hand, to improve low-temperature characteristics, for example, in a case of using ethyl methyl carbonate or acetic acid esters which have an asymmetric structure and are chain carbonic acid esters as the organic solvent of the electrolytic solution, there is a problem in that the characteristics of the nonaqueous electrolyte secondary battery at a high temperature conversely deteriorate. In addition, even in a case of using an organic solvent such as ethyl methyl carbonate in the electrolytic solution, solubility for a lithium salt is also deficient, and there is a limit to improvement of the low-temperature characteristics.

In contrast, in this embodiment, the organic solvent used in the electrolytic solution 50 is set to a mixed solvent that contains PC and EC, which are cyclic carbonate solvents, and DME, which is a chain ether solvent, in a mixing ratio set to an appropriate range. Accordingly, it is possible to realize the nonaqueous electrolyte secondary battery 1 capable of retaining sufficient discharging capacity in a broad temperature range including the low-temperature environment.

Specifically, first, when PC and EC, which have a high dielectric constant and high solubility for the supporting salt, are used as the cyclic carbonate solvent, discharging capacity of the nonaqueous electrolyte secondary battery 1 becomes large. In addition, when considering that the boiling points of PC and EC are high, even when being used or stored under a high-temperature environment, the electrolytic solution is less likely to volatilize.

In addition, when PC, which has a melting point lower than that of EC, and EC are mixed and used as the cyclic carbonate solvent, it is possible to improve low-temperature characteristics.

In addition, when DME having a low melting point is used as the chain ether solvent, the low-temperature characteristics are improved. In addition, DME has a low viscosity, and thus electrical conductivity of the electrolytic solution is improved. In addition, DME solvates with Li ions, and thus it is possible to obtain large discharging capacity as the nonaqueous electrolyte secondary battery.

The cyclic carbonate solvent has a structure expressed by Chemical Formula 1, and examples thereof include propylene carbonate (PC), ethylene carbonate (EC), butylene carbonate (BC), trifluoroethylene carbonate (TFPC), chloroethylene carbonate (ClEC), trifluoroethylene carbonate (TFEC), difluoroethylene carbonate (DFEC), vinylene carbonate (VEC), and the like. In the nonaqueous electrolyte secondary battery 1 according to the invention, particularly from the viewpoint of improvement of capacity retention rate at a high temperature in addition to the viewpoint of ease of film formation on an electrode onto the negative electrode 20 and improvement of the low-temperature characteristics, two kinds including PC and EC are used as the cyclic carbonate solvent having the structure expressed by Chemical Formula 1.

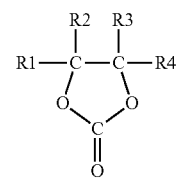

(Chemical Formula 1)

Here, in Chemical Formula 1, R1, R2, R3, and R4 represent any one of hydrogen, fluorine, chlorine, an alkyl group having 1 to 3 carbon atoms, and a fluorinated alkyl group. In addition, in Chemical Formula 1, R1, R2, R3, and R4 may be the same as each other or different from each other.

In this embodiment, as described above, when using PC and EC, which have a high dielectric constant and high solubility, for the supporting salt as the cyclic carbonate solvent, it is possible to obtain large discharging capacity. In addition, the electrolytic solution is less likely to volatilize even when being used or stored under a high-temperature environment when considering that PC and EC have a high boiling point. In addition, when PC, which has a melting point lower than that of EC, and EC are mixed and used as the cyclic carbonate solvent, it is possible to obtain excellent low-temperature characteristics.

The chain ether solvent has a structure expressed by Chemical Formula 2, and examples thereof include 1,2-dimethoxy ethane (DME), 1,2-diethoxy ethane (DEE), and the like.

In this embodiment, DME, which is likely to solvate with lithium ions, is used as the chain ether solvent having the structure expressed by Chemical Formula 2 from the viewpoint of improving the low-temperature characteristics while securing capacity at room temperature in addition to the viewpoint of improving conductivity.

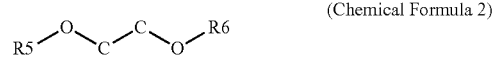

(Chemical Formula 2)

Here, in Chemical Formula 2, R5 and R6 represent any one of hydrogen, fluorine, chlorine, an alkyl group having 1 to 3 carbon atoms, and a fluorinated alkyl group. In addition, R5 and R6 may be the same as each other or different from each other.

In this embodiment, as described above, when DME having a low melting point is used as the chain ether solvent, the low-temperature characteristics are improved. In addition, DME has a low viscosity, and thus electrical conductivity of the electrolytic solution is improved. In addition, DME solvates with Li ions, and thus it is possible to obtain large discharging capacity as the nonaqueous electrolyte secondary battery.

In this embodiment, a mixing ratio of respective organic solvents in the solvent of the electrolytic solution 50 is set to a range of {PC:EC:DME}={0.5 to 1.5:0.5 to 1.5:1 to 3} in terms of a volume ratio. In addition, it is more preferable that the mixing ratio in the solvent be 0.8 to 1.2:0.8 to 1.2:1.5 to 2.5 in terms of a volume ratio, and still more preferable that the mixing ratio be in a range of approximately {PC:EC:DME}={1:1:2}.

When the mixing ratio of the organic solvents is in the above-described range, it is possible to more significantly obtain the above-described effect of improving the low-temperature characteristics without deteriorating the capacity retention rate at a high temperature or room temperature.

More specifically, when the mixing ratio of the propylene carbonate (PC), which is a cyclic carbonate solvent, is equal to or greater than the lower limit in the range, when PC having a melting point lower than that of EC, and EC are mixed and used, it is possible to significantly obtain the effect of improving the low-temperature characteristics.

On the other hand, PC has a lower dielectric constant in comparison to EC, and thus it is difficult to increase a concentration of the supporting salt. Accordingly, when the amount of PC contained is too great, there is a possibility that it is difficult to obtain large discharging capacity. As a result, it is preferable to limit the mixing ratio of PC to a value equal to or less than the upper limit of the range.

In addition, in the organic solvent, when the mixing ratio of the ethylene carbonate (EC), which is a cyclic carbonate solvent, is equal to or greater than the lower limit of the range, the dielectric constant of the electrolytic solution 50 and solubility for the supporting salt increase, and discharging capacity of the nonaqueous electrolyte secondary battery becomes large.

On the other hand, EC has a high viscosity, and thus EC is deficient in electrical conductivity. In addition, EC has a high melting point, and thus when the amount of EC contained is too large, the low-temperature characteristics may deteriorate. Accordingly, it is preferable to limit the mixing ratio thereof to a value equal to or less than the upper limit of the range.

In addition, when the mixing ratio of EC in the organic solvents is set to the range, it is possible to suppress an increase in internal resistance under a low-temperature environment.

In addition, in the organic solvent, when the mixing ratio of dimethoxy ethane (DME), which is a chain ether solvent, is set to be equal to or greater than the lower limit of the range, a predetermined amount of DME having a low melting point is included in the organic solvent, and thus the effect of improving the low-temperature characteristics becomes significant. In addition, DME has a low viscosity, and thus electrical conductivity is improved. In addition, DME solvates with Li ions, and thus it is possible to obtain large discharging capacity.

On the other hand, DME has a low dielectric constant, and thus it is difficult to increase a concentration of the supporting salt. Accordingly, when the amount of DME contained is too large, it may be difficult to obtain large discharging capacity, and thus it is preferable to limit the mixing ratio of DME to a value equal to or less than the upper limit of the range.

In addition, when the mixing ratio of DME in the organic solvents is set to the range, it is possible to suppress voltage drop at initial discharging.

As the supporting salt used in the electrolytic solution 50, a known Li compound added to the electrolytic solution as the supporting salt in the nonaqueous electrolyte secondary battery in the related art can be used. Specifically, lithium bis(fluorosulfonyl)imide (LiFSI) is used alone.

The amount of the supporting salt contained in the electrolytic solution 50 can be determined in consideration of the kind of supporting salt and in consideration of the kind of the following positive electrode active material. In this embodiment, the supporting salt is contained in the amount of 0.6 to 1.2 (mol/L) in terms of an individual amount of LiFSI. As the supporting salt in the electrolytic solution 50, when the lithium compound is included in a molar ratio of the range, it is possible to prevent the viscosity of the electrolytic solution from increasing under a low-temperature, sufficient discharging capacity is significantly obtained in a broad temperature range including a low-temperature environment, and thus battery characteristics are improved.

Furthermore, when a concentration of the supporting salt in the electrolytic solution 50 exceeds the upper limit of the range, it is difficult to obtain discharging capacity. When the concentration is less than the lower limit, internal resistance greatly increases. Accordingly, it is preferable that the concentration of the supporting salt in the electrolytic solution 50 be set to the range when considering that if the concentration is too high or too low, an adverse influence may be exerted on the battery characteristics.

As described above, it is preferable that LiFSI be used alone as the supporting salt used in the electrolytic solution 50, and 0.6 to 1.2 (mol/L) of LiFSI be contained in the electrolytic solution 50 when considering that it is possible to suppress voltage drop at initial discharging, it is also possible to improve discharging characteristics under a low-temperature environment, and thus sufficient discharging capacity is obtained in a broad temperature range. LiFSI is excellent in conductivity, and thus the above-described effect becomes more significant.

In this embodiment, first, the organic solvent used in the electrolytic solution 50 is set to have the above-described composition. According to this, the viscosity of the electrolytic solution is prevented from rising under a low-temperature environment of near −30° C., not only under room temperature conditions, and thus it is possible to suppress migration of electric charges from being hindered. According to this, the discharging characteristics under the low-temperature environment are improved, and thus it is possible to retain sufficient discharging capacity in a broad temperature range.

In addition, in this embodiment, as the supporting salt contained in the electrolytic solution 50, when employing a configuration in which the lithium compound is included in the molar ratio of the range, the above-described effect is more significantly obtained, and thus the battery characteristics are further improved.

In addition, in this embodiment, in addition to the optimization of the composition of the electrolytic solution 50, when the negative electrode 20, of which details will be described later, contains any one negative electrode active material between $SiO_x$ ($0 \leq X < 2$) in which at least a part of a surface is covered with carbon and a Li—Al alloy, the discharging characteristics under the low-temperature environment are improved, and the effect of retaining sufficient discharging capacity in a broad temperature range becomes more significant.

[Positive Electrode]

As the positive electrode 10, a positive electrode known in this field can be used without particular limitation as long as the positive electrode contains a positive electrode active material composed of a lithium-manganese oxide. In addition, a material obtained by mixing polyacrylic acid as a binding agent and graphite as a conductive auxiliary agent in addition to the positive electrode active material can be used as the positive electrode 10.

Examples of the positive electrode active material contained in the positive electrode 10 include lithium-manganese oxides such as $LiMn_2O_4$ and $Li_4Mn_5O_{12}$, which have a spinel-type crystal structure. Among the lithium-manganese oxides, a lithium-manganese oxide such as $Li_{1+x}Co_yMn_{2-x-y}O_4$ ($0 \leq x \leq 0.33$, $0 < y \leq 0.2$), in which Mn is partially substituted with Co, is more preferable. In this manner, when using the positive electrode active material in which a transition metal element such as Co and Ni is added to the lithium-manganese oxide and partial substitution with a transition metal element is performed, the discharging characteristics are further improved.

In this embodiment, when using the positive electrode active material composed of the lithium-manganese oxide having the above-described composition in the positive electrode 10, the discharging characteristics under a low-temperature environment are improved, and the effect of obtaining sufficient discharging capacity in a broad temperature range becomes more significant. As a result, the battery characteristics are further improved.

In addition, in this embodiment, not only one kind of lithium-manganese oxide but also a plurality of kinds of lithium-manganese oxides may be contained as the positive electrode active material.

In addition, in a case of using a granular positive electrode active material composed of the above-described material, a particle size (D50) is not particularly limited, and for example, a particle size of 0.1 to 100 μm is preferable, and a particle size of 1 to 10 μm is more preferable.

If the particle size (D50) of the positive electrode active material is less than the lower limit of the above-described preferable range, when the nonaqueous electrolyte secondary battery is exposed to a high temperature, reactivity increases, and thus handling becomes difficult. In addition, when the particle size exceeds the upper limit thereof, there is a concern that a discharging rate may decrease.

Furthermore, the "particle size (D50) of the positive electrode active material" in the invention is a particle size measured by a laser diffraction method known in the related art and represents a median size.

The amount of the positive electrode active material in the positive electrode 10 is determined in consideration of discharging capacity and the like required for the nonaqueous electrolyte secondary battery 1, and 50 to 95 mass % is preferable. When the amount of the positive electrode active material is equal to or more than the lower limit of the preferable range, it is easy to obtain sufficient discharging capacity. When the amount of the positive electrode active material is equal to or less than the upper limit of the preferable range, it is easy to mold the positive electrode 10.

The positive electrode 10 may contain a conductive auxiliary agent (hereinafter, the conductive auxiliary agent used in the positive electrode 10 may be referred to as a "positive electrode conductive auxiliary agent").

Examples of the positive electrode conductive auxiliary agent include carbonaceous materials such as furnace black, Ketjen black, acetylene black, and graphite.

As the positive electrode conductive auxiliary agent, the above-described carbonaceous materials may be used alone or in combination of two or more kinds thereof.

In addition, the amount of the positive electrode conductive auxiliary agent in the positive electrode 10 is preferably 4 to 40 mass %, and more preferably 10 to 25 mass %. When the amount of the positive electrode conductive auxiliary agent is equal to or greater than the lower limit of the preferable range, it is easy to obtain sufficient conductivity. In addition, in a case of molding the electrode in a pellet shape, molding becomes easy. On the other hand, when the amount of the positive electrode conductive auxiliary agent in the positive electrode 10 is equal to or less than the upper limit of the preferable range, it is easy to obtain sufficient discharging capacity in the positive electrode 10.

The positive electrode 10 may contain a binder (hereinafter, the binder used in the positive electrode 10 may be referred to as a "positive electrode binder").

As the positive electrode binder, a material known in the related art may be used, and examples thereof include polytetrafluoroethylene (PTFE), polyvinylidene fluoride (PVDF), styrene-butadiene rubber (SBR), polyacrylic acid (PA), carboxymethyl cellulose (CMC), polyvinyl alcohol (PVA), and the like. Among these, the polyacrylic acid is preferable, and a cross-linking type polyacrylic acid is more preferable.

In addition, as the positive electrode binder, the above-described materials may be used alone or in combination of two or more kinds thereof.

Furthermore, in a case of using the polyacrylic acid as the positive electrode binder, it is preferable that the polyacrylic acid be adjusted in advance to pH 3 to pH 10. In the pH adjustment in this case, for example, an alkali metal hydroxide such as lithium hydroxide, or an alkali-earth metal hydroxide such as magnesium hydroxide can be used.

The amount of the positive electrode binder in the positive electrode 10 may be set, for example, to 1 to 20 mass %.

The size of the positive electrode 10 is determined in correspondence with the size of the nonaqueous electrolyte secondary battery 1.

In addition, the thickness of the positive electrode 10 is also determined in correspondence with the size of the nonaqueous electrolyte secondary battery 1. In a case where the nonaqueous electrolyte secondary battery 1 is a coin type for back-up of various electronic apparatuses, for example, the thickness may be approximately 300 to 1000 μm.

The positive electrode 10 may be manufactured by a manufacturing method known in the related art.

Examples of a method of manufacturing the positive electrode 10 include a method in which the positive electrode active material, and at least one of the positive electrode conductive auxiliary agent and the positive electrode binder added as necessary are mixed to obtain a positive electrode mixture, and the positive electrode mixture is compression-molded into an arbitrary shape.

A pressure during the compression molding is determined in consideration of the kind of positive electrode conductive auxiliary agent and the like, and for example, can be set to 0.2 to 5 ton/cm².

As the positive electrode current collector 14, a material known in the related art can be used, and examples thereof include a conductive resin adhesive including carbon as a conductive filler, and the like.

[Negative Electrode]

The negative electrode 20 used in this embodiment includes $SiO_x$ (0≤X<2) in which at least a part of a surface is covered with carbon, or a Li—Al alloy as the negative electrode active material. As the negative electrode 20, a material obtained by additionally mixing an appropriate binder, a polyacrylic acid as a binding agent, graphite as a conductive auxiliary agent, and the like in addition to the negative electrode active material can also be used.

Examples of the negative electrode active material used in the negative electrode 20 include a material composed of SiO or SiO2, that is, a silicon oxide expressed by $SiO_x$ (0≤X<2). When using the silicon oxide having the composition as the negative electrode active material, it is possible to use the nonaqueous electrolyte secondary battery 1 at a high voltage, and cycle characteristics are improved.

In addition, the negative electrode 20 may further contain at least one among carbon, an alloy-based negative electrode active material other than the Li—Al alloy, Si, $WO_2$, and $WO_3$ as the negative electrode active material in addition to the $SiO_x$ (0≤X<2) or the Li—Al alloy.

When using the material as the negative electrode active material in the negative electrode 20, a reaction between the electrolytic solution 50 and the negative electrode 20 is suppressed during a charging and discharging cycle, and thus a decrease in capacity can be prevented. As a result, the cycle characteristics are improved.

In addition, when the negative electrode 20 includes a negative electrode active material composed of $SiO_x$ (0≤X<2) in which at least a part of a surface of is covered with carbon (C), or a Li—Al alloy, conductivity of the negative electrode 20 is improved, and thus an increase in internal resistance under the low-temperature environment is suppressed. According to this, voltage drop at initial discharging is suppressed, and thus it is possible to further stabilize the discharging characteristics. Furthermore, in a case of using the $SiO_x$ (0≤X<2) as the negative electrode active material, at least a part of a surface of particles composed of $SiO_x$ (0≤X<2) may be covered with carbon. However, it is preferable that the entirety of the surface be covered with carbon when considering that the above-described effect becomes more significant.

In this embodiment, as described above, first, the composition of the electrolytic solution 50 is optimized, and when employing the negative electrode 20 that includes a negative electrode active material composed of $SiO_x$ (0≤X<2) in which a surface is covered with carbon or a negative electrode active material composed of a Li—Al alloy, it is possible to improve the discharging characteristics under a low-temperature environment of near −30° C., not only under room temperature conditions. According to this, it is possible to realize the nonaqueous electrolyte secondary battery 1 in which excellent charging and discharging characteristics are obtained in a broad temperature range.

Furthermore, a method of covering a particle surface of $SiO_x$ (0≤X<2) with carbon is not particularly limited, and examples thereof include a physical vapor deposition method (PVD) using a gas including an organic material such as methane and acetylene, a chemical vapor deposition method (CVD), and the like.

In a case of using the $SiO_x$ (0≤X<2) as the negative electrode active material, for example, the particle size (D50) is preferably 0.1 to 30μm, and more preferably 1 to 10 μm without particular limitation. When the particle size (D50) of the negative electrode active material is in the above-described range, when expansion or contraction of the negative electrode occurs during charging and discharging of the nonaqueous electrolyte secondary battery, conductivity is retained. As a result, a decrease in charging and discharging characteristics such as cycle characteristics is suppressed. When the particle size (D50) of the negative electrode active material is less than the lower limit of the preferable range, for example, when the nonaqueous electrolyte secondary battery is exposed to a high temperature, reactivity increases, and thus handling becomes difficult. In addition, when the particle size exceeds the upper limit thereof, there is a concern that a discharging rate may decrease. In addition, the particle size (D50) of the negative electrode active material ($SiO_x$ (0≤X<2)) in this specification represents a particle size in a state in which at least a part of a surface of the $SiO_x$ (0≤X<2) is covered with carbon.

In addition, in this embodiment, it is more preferable that the negative electrode active material in the negative electrode 20 include both of lithium (Li) and $SiO_x$ (0≤X<2), and a molar ratio ($Li/SiO_x$) thereof be in a range of 3.7 to 4.9. In this manner, when the negative electrode active material includes both of Lithium (Li) and $SiO_x$, and the molar ratio thereof is set in the above-described range, it is possible to obtain an effect of preventing charging abnormality, and the like. In addition, even when the nonaqueous electrolyte secondary battery 1 is used or stored for a long period of time under a high-temperature environment, the discharging capacity does not decrease, and thus storage characteristics are improved.

When the molar ratio ($Li/SiO_x$) is less than 3.7, Li is deficient, and thus Li deficiency occurs in use or storage for a long period of time under a high-temperature environment, and thus the discharging capacity decreases.

On the other hand, when the molar ratio ($Li/SiO_x$) exceeds 4.9, Li is excessive, and thus charging abnormality may occur. In addition, metal Li remains without being trapped in $SiO_x$, and thus there is a possibility that internal resistance increases, and thus the discharging capacity may decrease.

In addition, in this embodiment, it is more preferable that the molar ratio ($Li/SiO_x$) in the above-described range be set by selecting a more appropriate range in correspondence with the kind of positive electrode active material contained in the positive electrode 10. For example, in a case of using lithium titanate as the positive electrode active material, it is more preferable that the molar ratio ($Li/SiO_x$) in the negative electrode active material be set to a range of 4.0 to 4.7. In addition, in a case of using lithium-manganese oxide as the positive electrode active material, it is more preferable that molar ratio ($Li/SiO_x$) in the negative electrode active material be set to a range of 3.9 to 4.9. As described above, when the molar ratio ($Li/SiO_x$) of the negative electrode active material is set to a range in correspondence with the kind of positive electrode active material, it is possible to obtain an effect of suppressing an increase in initial resistance and of preventing charging abnormality and the like, or it is possible to more significantly obtain an effect of improving storage characteristics without a decrease in discharging capacity even after use or storage for a long period of time under a high-temperature environment.

The amount of the negative electrode active material contained in the negative electrode 20 is determined in consideration of discharging capacity and the like required for the nonaqueous electrolyte secondary battery 1. For example, the amount of the negative electrode active material is preferably equal to or greater than 50 mass %, and more preferably 60 to 80 mass %.

In the negative electrode 20, when the amount of the negative electrode active material composed of the above-described material is equal to or greater than the lower limit of the preferable range, it is easy to obtain sufficient discharging capacity. In addition, when the amount of the negative electrode active material is equal to or less than the upper limit of the preferable range, it is easy to mold the negative electrode 20.

The negative electrode 20 may contain a conductive auxiliary agent (hereinafter, the conductive auxiliary agent used in the negative electrode 20 may be referred to as a "negative electrode conductive auxiliary agent"). The negative electrode conductive auxiliary agent is the same as the positive electrode conductive auxiliary agent.

The negative electrode 20 may contain a binder (hereinafter, the binder used in the negative electrode 20 may be referred to as a "negative electrode binder").

Examples of the negative electrode binder include polyvinylidene fluoride (PVDF), styrene-butadiene rubber (SBR), polyacrylic acid (PA), carboxymethyl cellulose (CMC), polyimide (PI), polyimide amide (PAI), and the like. Among these, the polyacrylic acid is preferable, and a cross-linking type polyacrylic acid is more preferable.

In addition, as the negative electrode binder, the above-described materials may be used alone or in combination of two or more kinds thereof. In addition, in a case of using the polyacrylic acid as the negative electrode binder, it is preferable that the polyacrylic acid be adjusted in advance to pH 3 to pH 10. For example, the pH adjustment in this case can be performed through addition of an alkali metal hydroxide such as lithium hydroxide, or an alkali-earth metal hydroxide such as magnesium hydroxide.

For example, the amount of the negative electrode binder contained in the negative electrode 20 may be set to 1 to 20 mass %.

Furthermore, the size and the thickness of the negative electrode 20 are the same as the size and the thickness of the positive electrode 10.

In addition, in the nonaqueous electrolyte secondary battery 1 illustrated in FIG. 1, lithium foil 60 is provided on a surface of the negative electrode 20, that is, between the negative electrode 20 and the separator 30 to be described later.

Examples of a method of manufacturing the negative electrode 20 include a method in which the above-described material is used as the negative electrode active material, and the negative electrode conductive auxiliary agent such as graphite and/or the negative electrode binder are mixed as necessary to prepare a negative electrode mixture, and the negative electrode mixture is compression-molded into an arbitrary shape.

A pressure during the compression molding is determined in consideration of the kind of negative electrode conductive auxiliary agent and the like, and for example, can be set to 0.2 to 5 ton/cm$^2$.

In addition, the same material as the positive electrode current collector 14 can be used for the negative electrode current collector 24.

[Separator]

The separator 30 is interposed between the positive electrode 10 and the negative electrode 20, and as the separator 30, an insulating film, which has large ion permeability, is excellent in heat resistance, and has a predetermined mechanical strength, is used.

As the separator 30, a separator formed from a material used in a separator of a nonaqueous electrolyte secondary battery in the related art and satisfies the above-described characteristics may be applied without any limitation. Examples of the material include glass such as alkali glass, borosilicate glass, quartz glass, and lead glass, non-woven fabric or fiber formed from a resin such as polyphenylene sulfide (PPS), polyether ether ketone (PEEK), polyethylene terephthalate (PET), polyamide-imide (PAI), polyamide, polyimide (PI), aramid, cellulose, a fluorine resin, and a ceramic resin, and the like. Among these, as the separator 30, it is more preferable to use the non-woven fabric formed from glass fiber. The glass fiber is excellent in mechanical strength and has large ion permeability, and thus the glass fiber reduces internal resistance. Accordingly, it is possible to improve discharging capacity.

The thickness of the separator 30 is determined in consideration of the size of the nonaqueous electrolyte secondary battery 1, a material of the separator 30, and the like, and for example, can be set to approximately 5 to 300 μm.

[Capacity Balance between Negative Electrode and Positive Electrode]

In the nonaqueous electrolyte secondary battery 1 of this embodiment, it is preferable that capacity balance {negative electrode capacity (mAh)/positive electrode capacity (mAh)}, which is expressed by capacity of the negative electrode 20 and capacity of the positive electrode 10, be in a range of 1.56 to 2.51.

When the capacity balance between the negative electrode 20 and the positive electrode 10 is set to the above-described range, a predetermined margin can be secured for the capacity on the negative electrode side. Accordingly, for example, even when decomposition of the negative electrode active material rapidly progresses due to a battery reaction, it is possible to secure the negative electrode capacity equal to or greater than a constant value. Accordingly, even when the nonaqueous electrolyte secondary battery 1 is used and stored for a long period of time under a strict high-temperature and high-humidity environment, a decrease in discharging capacity is suppressed, and thus it is possible to obtain an effect of improving storage characteristics.

When the capacity balance between the negative electrode 20 and the positive electrode 10 is less than 1.56, deterioration increases during use for a long period of time under a high-temperature environment, and thus capacity retention becomes difficult. On the other hand, when the capacity balance between the negative electrode 20 and the positive electrode 10 exceeds 2.51, it is difficult to obtain sufficient discharging capacity.

In the nonaqueous electrolyte secondary battery 1 of this embodiment, the composition of the electrolytic solution 50 is optimized as described above. In addition, as the negative electrode 20, an electrode including at least a negative electrode active material composed of SiO$_x$ (0≤X<2) in which at least a part of a surface is covered with carbon or a negative electrode active material composed of a Li—Al alloy is used. In addition, the capacity balance between the negative electrode 20 and the positive electrode 10 is set to the above-described appropriate range. According to this, the discharging characteristics under a low-temperature environment are improved, and thus sufficient discharging capacity can be retained in a broad temperature range. In addition, storage characteristics become excellent.

<Other Aspects of Nonaqueous Electrolyte Secondary Battery>

In this embodiment, as an embodiment of the nonaqueous electrolyte secondary battery, description has been given of the nonaqueous electrolyte secondary battery having a coin-type structure including the accommodation container obtained by crimping the positive electrode casing and the negative electrode casing formed from stainless steel, but the invention is not limited thereto. For example, it is also possible to employ a nonaqueous electrolyte secondary battery having a structure in which an opening of a ceramic container main body is sealed with a ceramic lid through a heating treatment such as seam welding using a metallic sealing member.

In addition, for example, the configuration related to the invention is also applicable to an electrochemical cell such as a lithium ion capacitor.

<Use of Nonaqueous Electrolyte Secondary Battery>

As described above, according to the nonaqueous electrolyte secondary battery 1 of this embodiment, the discharging characteristics under a low-temperature environment are excellent, and sufficient discharging capacity is obtained in a broad temperature range. In addition, even when the nonaqueous electrolyte secondary battery 1 is used and stored for a long period of time under a strict temperature and humidity environment, high discharging capacity can be retained, and storage characteristics are excellent. Accordingly, the nonaqueous electrolyte secondary battery 1 is appropriately used as a back-up power supply having a voltage value, for example, 2 to 3 V.

<Operational Effect>

As described above, according to the nonaqueous electrolyte secondary battery 1 as an embodiment of the invention, in the electrolytic solution 50, an organic solvent containing propylene carbonate (PC), ethylene carbonate (EC), and dimethoxy ethane (DME) in a range of {PC:EC:DME}={0.5 to 1.5:0.5 to 1.5:1 to 3} in terms of a volume ratio is used, and a supporting salt containing lithium bis(fluorosulfonyl)imide (LiFSI) in an individual amount of 0.6 to 1.2 (mol/L) is used. In addition, the negative electrode 20, which includes $SiO_x$ (0≤X<2) in which at least a part of a surface is covered with carbon, or a Li—Al alloy as a negative electrode active material, is used. In addition, the viscosity of the electrolytic solution is constant at higher than −30° C. to room temperature.

As described above, the composition of the organic solvent and the supporting salt used in the electrolytic solution is optimized, and the above-described material is used as the negative electrode active material in the negative electrode. Accordingly, it is possible to improve the discharging characteristics under a low-temperature environment. That is, even when the nonaqueous electrolyte secondary battery 1 is used or stored under a low-temperature environment of near −30° C., not only under room temperature conditions, excellent discharging characteristics are obtained, and thus it is possible to retain sufficient discharging capacity in a broad temperature range.

Accordingly, it is possible to provide the nonaqueous electrolyte secondary battery 1 in which the battery characteristics do not deteriorate even under the low-temperature environment, not only under room temperature conditions, and thus excellent charging and discharging characteristics are obtained in a broad temperature range, and excellent storage characteristics are provided.

EXAMPLES

Next, the invention will be described in more detail with reference to Examples and Comparative Examples (including Production Example, Reference Examples and Experiment Example). However, a range of the invention is not limited by Examples. The nonaqueous electrolyte secondary battery related to the invention may be executed by making appropriate modifications in a range not departing from the gist of the invention.

<Adjustment of Electrolytic Solution and Preparation of Nonaqueous Electrolyte Secondary Battery>

Production Example 1, Example 2, and Comparative Example 1

In Production Example 1, Example 2, and Comparative Example 1, a coin-type nonaqueous electrolyte secondary battery illustrated in FIG. 1 was prepared as an electrochemical cell. Furthermore, in this example, a nonaqueous electrolyte secondary battery was prepared by adjusting an electrolytic solution having a composition illustrated in Table 1, and by using $Li_{1.14}Co_{0.06}Mn_{1.80}O_4$ as a positive electrode active material, and SiO, in which the entirety of surface is covered with carbon, as a negative electrode active material. In this example, a coin-type (920 size) nonaqueous electrolyte secondary battery (lithium secondary battery), in which an external shape and the thickness in the cross-sectional view illustrated in FIG. 1 were respectively set to 9.5 mm and 2.0 mm, was prepared.

(Adjustment of Electrolytic Solution)

First, the organic solvent was adjusted in accordance with a mixing ratio (volume%) illustrated in Table 1, and the supporting salt was dissolved in the organic solvent to adjust the electrolytic solution 50. At this time, as the organic solvent, propylene carbonate (PC), ethylene carbonate (EC), and dimethoxy ethane (DME) were mixed in a ratio of {PC:EC:DME}={1:1:2} in terms of a volume ratio to adjust a mixed solvent. Then, as the supporting salt, lithium bis(fluorosulfonyl)imide (LiFSI) (Example 2) or lithium bis(trifluoromethane sulfonyl) imide (LiTFSI) (Production Example 1, Comparative Example 1) was dissolved in the mixed solvent that was obtained in a concentration illustrated in Table 1 to obtain the electrolytic solution 50.

(Preparation of Battery)

With regard to the positive electrode 10, first, graphite as a conductive auxiliary agent and polyacrylic acid as a binding agent were mixed in commercially available lithium-manganese oxide ($Li_{1.14}Co_{0.06}Mn_{1.80}O_4$) in a ratio of lithium-manganese oxide:graphite:polyacrylic acid=90:8:2 (mass ratio) to obtain a positive electrode mixture.

Then, 98.6 mg of positive electrode mixture that was obtained was compressed with a compression force of 2 ton/cm² to perform compression molding into a disc-shaped pellet having a diameter of 8.9 mm.

Next, the pellet (positive electrode 10) that was obtained was bonded to an inner surface of the positive electrode casing 12 formed from stainless steel (NAS64: t=0.20 mm) using a conductive resin adhesive containing carbon to integrate the pellet and the positive electrode casing 12, thereby obtaining a positive electrode unit. Then, the positive electrode unit was decompressed, heated, and dried under conditions of 120° C. for 11 hours in the air.

In addition, a sealing agent was applied to an inner side surface of the opening 12a of the positive electrode casing 12 in the positive electrode unit.

Next, with regard to the negative electrode 20, first, a SiO powder, in which carbon (C) is formed on the entirety of a surface, was prepared as a negative electrode active material. In addition, graphite as a conductive auxiliary agent and polyacrylic acid as a binding agent were mixed to the negative electrode active material in a ratio of 54:44:2 (mass ratio) to obtain a negative electrode mixture.

Next, 15.1 mg of negative electrode mixture that was obtained was compression-molded with a compression force of 2 ton/cm² into a disc-shaped pellet having a diameter of 6.7 mm.

Next, the pellet (negative electrode 20) that was obtained was bonded to an inner surface of the negative electrode casing 22 formed from stainless steel (SUS304-BA: t=0.20 mm) using a conductive resin adhesive containing carbon as a conductive filler to integrate the pellet and the negative electrode casing 22, thereby obtaining a negative electrode unit. Then, the negative electrode unit was decompressed, heated, and dried under conditions of 160° C. for 11 hours in the air.

In addition, lithium foil 60 punched with a diameter of 6.1 mm and a thickness of 0.38 mm was additionally compressed onto the negative electrode 20 having a pellet shape to prepare a lithium-negative electrode stacked electrode.

Next, the positive electrode casing 12 and the negative electrode casing 22 were filled with the electrolytic solution 50, which was adjusted in the above-described procedure, in a total amount of 40 μL for each battery.

Next, the negative electrode unit was caulked to the positive electrode unit so that the separator 30 came into contact with the positive electrode 10. In addition, the positive electrode casing 12 and the negative electrode casing 22 were sealed through fitting of the opening of the positive electrode casing 12, and the resultant sealed body was left still at 25° C. for seven days to obtain a nonaqueous electrolyte secondary battery of Production Example 1, Example 2, and Comparative Example 1.

TABLE 1

| | Electrode | | Capacity balance (Negative electrode capacity/ positive electrode capacity) | Electrolytic solution | | | | Internal resistance (Ω) |
|---|---|---|---|---|---|---|---|---|
| | Positive electrode active material | Negative electrode active material | | Organic solvent | Ratio | Supporting salt | Concentration (mol/L) | Room temperature |
| Production Example 1 | $Li_{1.14}Co_{0.06}Mn_{1.80}O_4$ | SiO (covered with carbon) | 2.02 | PC + EC + DME | 1:1:2 | LiTFSI | 1 | 24.1 |
| Example 2 | | | | | | LiFSI | 1 | 19.8 |
| Comparative Example 1 | | | | | | LiTFSI | 1.4 | 40.6 |

| | Internal resistance (Ω) −40° C. | Discharging capacity (mAh) (current: 5 μA) | | | Discharging capacity (mAh) (current: 25 μA) | | |
|---|---|---|---|---|---|---|---|
| | | Room temperature | −40° C. | Capacity retention rate (%) | Room temperature | −40° C. | Capacity retention rate (%) |
| Production Example 1 | 392.9 | 7.94 | 4.97 | 69 | 7.94 | 3.5 | 46 |
| Example 2 | 176.5 | — | — | — | 7.46 | 3.72 | 50 |
| Comparative Example 1 | 1265.9 | 7.94 | 0.21 | 3 | — | — | — |

As described above, in this example, the positive electrode casing 12 was provided with a function of a positive electrode current collector, and the negative electrode casing 22 was provided with a function of a negative electrode current collector without providing the positive electrode current collector 14 and the negative electrode current collector 24 illustrated in FIG. 1. In this manner, a nonaqueous electrolyte secondary battery was prepared.

In addition, in preparation of the electrodes, capacity balance {negative electrode capacity (mAh)/positive electrode capacity (mAh)}, which is expressed by the capacity of the negative electrode 20 and the capacity of the positive electrode 10, was adjusted to a value illustrated in Table 1.

Next, non-woven fabric formed from glass fiber was dried and was punched into a disc shape having a diameter of 7 mm to prepare the separator 30. In addition, the separator 30 was mounted on the lithium foil 60 compressed onto the negative electrode 20, and the gasket 40 formed from polypropylene was disposed over an opening of the negative electrode casing 22.

Comparative Example 2

In Comparative Example 2, a nonaqueous electrolyte secondary battery was prepared by the same procedure as in Production Example 1 except that in the battery preparation conditions in Production Example 1, the positive electrode active material used in the positive electrode was changed to a material composed of $Li_4Mn_5O_{12}$, a negative electrode including a negative electrode active material composed of SiO in which a surface is not covered with carbon was used as the negative electrode, the capacity balance {negative electrode capacity (mAh)/positive electrode capacity (mAh)}, which is expressed by the capacity of the negative electrode and the capacity of the positive electrode, was adjusted to a value illustrated in Table 2 during preparation of the respective electrodes.

TABLE 2

| | Electrode | | Capacity balance (Negative electrode capacity/ positive electrode capacity) | Electrolytic solution | | | | Internal resistance (Ω) |
|---|---|---|---|---|---|---|---|---|
| | Positive electrode active material | Negative electrode active material | | Organic solvent | Ratio | Supporting salt | Concentration (mol/L) | Room temperature |
| Production Example 1 | $Li_{1.14}Co_{0.06}Mn_{1.80}O_4$ | SiO (covered with carbon) | 2.02 | PC + EC + DME | 1:1:2 | LiTFSI | 1 | 24.1 |
| Comparative Example 2 | $Li_4Mn_5O_{12}$ | SiO (not covered with carbon) | 1 | | | | | 65.2 |

| | Internal resistance (Ω) -40° C. | Discharging capacity (mAh) (current: 5 μA) | | | Discharging capacity (mAh) (current: 15 μA) | | |
|---|---|---|---|---|---|---|---|
| | | Room temperature | -40° C. | Capacity retention rate (%) | Room temperature | -40° C. | Capacity retention rate (%) |
| Production Example 1 | 392.9 | 7.94 | 4.97 | 69 | 7.94 | 4.04 | 56 |
| Comparative Example 2 | 1293.2 | 5.55 | 0.32 | 6 | 5.55 | 0.1 | 2 |

Experiment Example 1

In Experiment Example 1, a nonaqueous electrolyte secondary battery was prepared by the same procedure as in Production Example 1 except that in the battery preparation conditions in Production Example 1, the capacity balance {negative electrode capacity (mAh)/positive electrode capacity (mAh)}, which is expressed by the capacity of the negative electrode and the capacity of the positive electrode, was adjusted to a value illustrated in Table 3 during preparation of the respective electrodes.

TABLE 3

| | Electrode | | Capacity balance (Negative electrode capacity/ positive electrode capacity) | Electrolytic solution | | | | Internal resistance (Ω) |
|---|---|---|---|---|---|---|---|---|
| | Positive electrode active material | Negative electrode active material | | Organic solvent | Ratio | Supporting salt | Concentration | Room temperature |
| Production Example 1 | $Li_{1.14}Co_{0.06}Mn_{1.80}O_4$ | SiO (covered with carbon) | 2.03 | PC + EC + DME | 1:1:2 | LiTFSI | 1 mol/L | 24.1 |
| Experiment Example 1 | | | 1.53 | | | | | 98.1 |

| | Internal resistance (Ω) -40° C. | Discharging capacity (mAh) (current: 5 μA) | | | Discharging capacity (mAh) (current: 10 μA) | | |
|---|---|---|---|---|---|---|---|
| | | Room temperature | -40° C. | Capacity retention rate (%) | Room temperature | -40° C. | Capacity retention rate (%) |
| Production Example 1 | 392.9 | 7.94 | 4.97 | 69 | 7.94 | 4.57 | 64 |
| Experiment Example 1 | 1499.7 | 1.99 | 0.57 | 29 | 1.99 | 0.22 | 11 |

Examples 3 to 6, and Comparative Examples 3 to 6

In Examples 3 to 6, and Comparative Examples 3 to 6, a nonaqueous electrolyte secondary battery was prepared by the same procedure as in Production Example 1 except that in the battery preparation conditions in Production Example 1, a concentration of the supporting salt (LiFSI) included in the electrolytic solution was changed to a value illustrated in Table 4, and the capacity balance {negative electrode capacity (mAh)/positive electrode capacity (mAh)} was adjusted to a value illustrated in Table 4. Furthermore, in Examples 3 to 6, and Comparative Examples 3 to 6, a coin-type (621 size) nonaqueous electrolyte secondary battery in which the external shape and the thickness in the cross-sectional view illustrated in FIG. 1 were respectively set to 6.8 mm and 2.1 mm was prepared.

TABLE 4

| | Electrode | | Capacity balance (Negative electrode capacity/ positive electrode capacity) | Electrolytic solution | | | | Discharging capacity (mAh) (current: 15 μA) | | |
|---|---|---|---|---|---|---|---|---|---|---|
| | Positive electrode active material | Negative electrode active material | | Organic solvent | Ratio | Supporting salt | Concentration (mol/L) | Room temperature | −40° C. | Capacity retention rate (%) |
| Example 3 | $Li_{1.14}Co_{0.06}Mn_{1.80}O_4$ | SiO (covered with carbon) | 2.17 | PC + EC + DME | 1:1:2 | LiFSI | 0.6 | 3.435 | 1.167 | 34.0 |
| Example 4 | | | | | | | 0.8 | 3.403 | 0.965 | 28.4 |
| Example 5 | | | | | | | 1.0 | 3.407 | 1.024 | 30.1 |
| Example 6 | | | | | | | 1.2 | 3.416 | 0.967 | 28.3 |
| Comparative Example 3 | | | | | | | 1.4 | 3.441 | 0.740 | 21.5 |
| Comparative Example 4 | | | | | | | 1.6 | 3.435 | 0.589 | 17.1 |
| Comparative Example 5 | | | | | | | 1.8 | 3.440 | 0.417 | 12.1 |
| Comparative Example 6 | | | | | | | 2.0 | 3.348 | 0.242 | 7.2 |

Examples 7 to 10, Reference Example 11 and Comparative Examples 7 to 9

In Examples 7 to 10, Reference Example 11 and Comparative Examples 7 to 9, a nonaqueous electrolyte secondary battery was prepared by the same procedure as in Production Example 1 except that in the battery preparation conditions in Production Example 1, the negative electrode active material used in the negative electrode was changed to a material composed of a Li—Al alloy, and the concentration of the supporting salt (LiFSI) included in the electrolytic solution was changed to a value illustrated in Table 5. Furthermore, in Examples 7 to 10, Reference Example 11 and Comparative Examples 7 to 9, a coin-type (414 size) nonaqueous electrolyte secondary battery in which the external shape and the thickness in the cross-sectional view illustrated in FIG. 1 were respectively set to 4.8 mm and 1.4 mm was prepared.

Comparative Example 10

In Comparative Example 10, a nonaqueous electrolyte secondary battery was prepared in the same conditions and the same procedure as in Examples 7 to 10, Reference Example 11 and Comparative Examples 7 to 9 except that an organic solvent including triethylene glycol (TEG) and 1,2-diethoxy ethane (DEE) in a ratio of 1:1 was used the electrolytic solution, and LiTFSI was added as the supporting salt.

TABLE 5

| | Electrode | | Electrolytic solution | | | | Discharging capacity (mAh) (current: 5 μA) | | |
|---|---|---|---|---|---|---|---|---|---|
| | Positive electrode active material | Negative electrode active material | Organic solvent | Ratio | Supporting salt | Concentration (mol/L) | Room temperature | −40° C. | Capacity retention rate (%) |
| Example 7 | Li$_{1.14}$Co$_{0.06}$Mn$_{1.80}$O$_4$ | Li—Al alloy | PC + EC + DME | 1:1:2 | LiFSI | 0.6 | 1.080 | 0.656 | 60.8 |
| Example 8 | | | | | | 0.8 | 1.080 | 0.630 | 58.4 |
| Example 9 | | | | | | 1.0 | 1.108 | 0.661 | 59.7 |
| Example 10 | | | | | | 1.2 | 1.071 | 0.384 | 35.8 |
| Reference Example 11 | | | | | | 1.4 | 1.100 | 0.354 | 32.1 |
| Comparative Example 7 | | | | | | 1.6 | 1.099 | 0.261 | 23.7 |
| Comparative Example 8 | | | | | | 1.8 | 1.068 | 0.094 | 8.8 |
| Comparative Example 9 | | | | | | 2.0 | 1.078 | 0.054 | 5.0 |
| Comparative Example 10 | | | TEG + DEE | 1:1 | LiTFSI | 2.0 | 0.992 | 0.316 | 31.9 |

<Evaluation Method>

The following evaluation test was carried out with respect to the nonaqueous electrolyte secondary batteries in Examples 2 to 10, Production Example 1, Reference Examples 11, Experiment Example 1, and Comparative Examples 1 to 10 which were obtained in the procedure.

[Internal Resistance Test]

The internal resistance of the nonaqueous electrolyte secondary battery of Production Examples 1, Example 2, Experiment Example 1, and Comparative Examples 1 and 2 was measured by using a commercially available LCR meter with an R function, and a value at an alternating current of 1 kHz was measured. At this time, the internal resistance of the nonaqueous electrolyte secondary batteries of respective examples was measured under two kinds of temperature conditions, that is, under a room temperature (25° C.) environment and under a low-temperature (−40° C.) environment, and results are illustrated in Table 1 to Table 3.

[Discharging Capacity and Capacity Retention Rate]

With respect to the nonaqueous electrolyte secondary batteries of Examples 2 to 10, Production Example 1, Reference Example 11, Experiment Example 1, and Comparative Examples 1 to 10, a low-temperature storage test to be described below was performed to evaluate the capacity retention rate under the low-temperature environment.

Specifically, first, the nonaqueous electrolyte secondary batteries of Examples 2 to 10, Production Example 1, Reference Example 11, Experiment Example 1, and Comparative Examples 1 to 10 were discharged under an environment of 25° C. with a constant current of 5 μA and 25 μA (discharging current) until reaching a voltage of 2.0 V, and then, a voltage of 3.1 V was applied to the nonaqueous electrolyte secondary batteries for 72 hours under an environment of 25° C. Then, capacity when performing discharging with a constant current of 5 μA and 25 μA (discharging current) under an environment of 25° C. until reaching a voltage of 2.0 V was measured, and the resultant value is illustrated in Tables 1 to 3 as discharging capacity (initial capacity: mAh) under a room temperature.

Next, the nonaqueous electrolyte secondary batteries were left as is for 60 days while being exposed to a low-temperature environment of −40° C. by using a constant-humidity and constant-temperature bath.

In addition, with respect to the nonaqueous electrolyte secondary batteries exposed to the low-temperature environment of the above-described conditions, capacity when performing discharging with a discharging current of a constant current of 5 μA, and any one discharging current among 10 μA, 15 μA, and 25 μA under an environment of 25° C. until reaching a voltage of 2.0 V was measured, and the resultant value is illustrated in Tables 1 to 3 as discharging capacity (capacity after test: mAh) after being left as is at a low temperature (−40° C.), and a capacity retention rate at this time is illustrated in Tables 1 to 3.

In the capacity retention rate test in this example, a variation (reduced state) of capacity after a test with respect to the initial capacity at room temperature (25° C.) was set as an index of the capacity retention rate under the low-temperature environment.

[Evaluation Result]

As illustrated in Table 1, in the nonaqueous electrolyte secondary batteries of Example 2 in which an electrolytic solution obtained by using a mixed solvent and a supporting salt defined in the invention (the aspect) was used as the organic solvent, and which include a positive electrode including Li$_{1.14}$Co0.06Mn$_{1.80}$O$_4$, which is a lithium-manganese oxide, as the positive electrode active material, and a negative electrode including SiO, in which a surface is covered with carbon, as the negative electrode active material, internal resistance at room temperature (25° C.) was 19.8 (Ω), and internal resistance at a low temperature (−40° C.) was 176.5 (Ω). As a result, it could be seen that the internal resistance was further suppressed in comparison to Comparative Examples 1 and 2 (40.6 to 65.2 (Ω) at room temperature, and 1265.9 to 1293.2 (Ω) at a low temperature).

In addition, when being discharged with a constant current of 25 μA, a capacity retention rate of the nonaqueous electrolyte secondary battery of Examples 2 was 50 (%). In Comparative Examples 1 and 2, when being discharged with a constant current of 15 μA or 25 μA, capacity measurement was impossible due to voltage drop, or even though the capacity measurement was possible, the capacity retention rate was merely approximately 2%. From this result, it is apparent that the nonaqueous electrolyte secondary batteries of Examples 2 having the configuration related to the invention have excellent capacity retention rate.

Here, in Comparative Example 1 illustrated in Table 1, a types of the supporting salt (LiTFSI) and a concentration of the supporting salt contained in the electrolytic solution deviates the types and a range defined in the invention.

Accordingly, it is considered that the internal resistance was not suppressed, and the capacity retention rate of the discharging capacity at a low temperature with respect to the discharging capacity at room temperature was lowered.

On the other hand, Table 2 illustrates evaluation results of Production Example 1 which includes a negative electrode including SiO in which a surface is covered with carbon as the negative electrode active material, and capacity balance between the negative electrode and the positive electrode is set to 2.02, and Comparative Example 2 which includes a negative electrode including SiO in which a surface is not covered with carbon as the negative electrode active material, and capacity balance between the negative electrode and the positive electrode is set to 1.

In addition, Table 3 illustrates results of Experiment Example 1 and Production Example 1. Experiment Example 1 is common to Production Example 1 in that an electrolytic solution including the mixed solvent and the supporting salt is used, and a positive electrode including $Li_{1.14}Co_{0.06}Mn_{1.80}O_4$, which is a lithium-manganese oxide, as the positive electrode active material and a negative electrode including SiO in which a surface is covered with carbon as the negative electrode active material are provided. In Experiment Example 1, only the capacity balance between the negative electrode and the positive electrode is changed differently from Production Example 1. As illustrated in Table 3, in case of the capacity balance {negative electrode capacity (mAh)/positive electrode capacity (mAh)} between the negative electrode and the positive electrode is in a range of 1.56 to 2.51, it can be seen that the internal resistance is suppressed to a very low value, and the capacity retention rate of the discharging capacity at a low temperature with respect to the discharging capacity at room temperature is very high in comparison to the capacity balance between the negative electrode and the positive electrode is out of the above-described range.

In addition, as illustrated in Table 4, in a case where the concentration of the supporting salt (LiFSI) in the electrolytic solution varies, in Examples 3 to 6 in which the concentration of LiFSI is in a range of 0.6 to 1.2 mol/L, it can be seen that the capacity retention rate of the discharging capacity at a low temperature is 21.5 to 34.0(%), and is higher in comparison to Comparative Examples 3 to 6 (7.2 to 17.1(%)).

In addition, as illustrated in Table 5, even in a case where a negative electrode containing a Li—Al alloy is used as the negative electrode active material instead of SiO in which a surface is covered with carbon, and the concentration of the supporting salt (LiFSI) in the electrolytic solution varies, in Examples 7 to 10 in which the concentration of LiFSI is in a range of 0.6 to 1.2 mol/L, it can be seen that the capacity retention rate of the discharging capacity at a low temperature is 35.8 to 60.8(%), and is higher in comparison to Comparative Examples 7 to 9 (5.0 to 23.7(%)). Particularly, in a case where the concentration of the supporting salt in the electrolytic solution is in a range of 0.6 (Example 7) to 1.0 (Example 9) mol/L, it can be seen that the capacity retention rate of the discharging capacity at a low temperature is 58.4 to 60.8(%) and is significantly excellent.

On the other hand, in Comparative Examples 3 to 6 illustrated in Table 4, the concentration of the supporting salt (LiFSI) in the electrolytic solution deviates from the range defined in the invention (the aspect). Therefore, it is considered that in Comparative Examples 3 to 6, the capacity retention rate of the discharging capacity at a low temperature with respect to the discharging capacity at room temperature is lowered.

In addition, in Comparative Examples 7 to 9 illustrated in Table 5, the concentration of the supporting salt (LiFSI) in the electrolytic solution also deviates from the range defined in the invention (the aspect). Therefore, it is considered that in Comparative Examples 7 to 9, the capacity retention rate of the discharging capacity at a low temperature with respect to the discharging capacity at room temperature is also lowered.

Furthermore, in Comparative Example 10 illustrated in Table 5, the composition of the organic solvent included in the electrolytic solution, the types of the supporting salt and the concentration of the supporting salt included in the electrolytic solution are out of the types and the range defined in the invention (the aspect). Therefore, it is considered that in Comparative Example 10, the capacity retention rate of the discharging capacity at a low temperature with respect to the discharging capacity at room temperature is also lowered.

From the above-described results of Examples, when employing a configuration in which the electrolytic solution having the composition defined in the invention is used, and the negative electrode including $SiO_x$ ($0 \leq X < 2$), in which at least a part of a surface is covered with carbon, is used as the negative electrode active material, it is apparent that it is possible to obtain a nonaqueous electrolyte secondary battery capable of improving discharging characteristics under a low-temperature environment not only under room temperature conditions, and capable of retaining sufficient discharging capacity in a broad temperature range.

INDUSTRIAL APPLICABILITY

According to the nonaqueous electrolyte secondary battery of the invention, the composition of the organic solvent and the supporting salt used in the electrolytic solution is optimized, and the negative electrode includes at least one of a negative electrode active material in which a surface is covered with carbon and a negative electrode active material composed of a Li—Al alloy. Accordingly, even in a case where a nonaqueous electrolyte secondary battery is used or stored under a low-temperature environment of near −30° C. not only under room temperature conditions, excellent discharging characteristics are obtained, and thus excellent charging and discharging characteristics are obtained in a broad temperature range. Accordingly, when the invention is applied to, for example, a nonaqueous electrolyte secondary battery used in fields of various electronic apparatuses and the like, it is possible to contribute to a performance improvement of the various electronic apparatuses and the like.

REFERENCE SIGNS LIST

1: Nonaqueous electrolyte secondary battery
2: Accommodation container
10: Positive electrode
12: Positive electrode casing
12a: Opening
14: Positive electrode current collector
20: Negative electrode
22: Negative electrode casing
22a: Apical end
24: Negative electrode current collector
30: Separator
40: Gasket 41: Annular groove
50: Electrolytic solution
60: Lithium foil

What is claimed is:

1. A nonaqueous electrolyte secondary battery, comprising:
   a positive electrode that includes a lithium-manganese oxide as a positive electrode active material;
   a negative electrode that includes $SiO_x$ ($0 \leq X < 2$) in which at least a part of a surface is covered with carbon, or a Li—Al alloy as a negative electrode active material;
   a low-viscosity electrolytic solution that contains propylene carbonate (PC), ethylene carbonate (EC), and dimethoxy ethane (DME) as an organic solvent in a range of {PC:EC:DME}={0.5 to 1.5:0.5 to 1.5:1 to 3} in terms of a volume ratio, and lithium bis(fluorosulfonyl)imide (LiFSI) as a supporting salt in an individual amount of 0.6 to 1.2 (mol/L), and
   the viscosity of the electrolytic solution is constant at higher than −30° C. to room temperature.

2. The nonaqueous electrolyte secondary battery according to claim 1,
   wherein the positive electrode includes at least $Li_{1+x}Co_yMn_{2-x-y}O_4$ ($0 \leq x \leq 0.33$, $0 < y \leq 0.2$) as the lithium-manganese oxide used in the positive electrode active material.

3. The nonaqueous electrolyte secondary battery according to claim 1,
   wherein capacity balance {negative electrode capacity (mAh)/positive electrode capacity (mAh)}, which is expressed by capacity of the negative electrode and capacity of the positive electrode, is in a range of 1.56 to 2.51.

4. The nonaqueous electrolyte secondary battery according to claim 1,
   wherein a particle size (D50) of $SiO_x$ ($0 \leq X < 2$) included in the negative electrode active material and in which at least a part of a surface is covered with carbon is 0.1 to 30 μm.

* * * * *